US011080151B2

(12) United States Patent
Ranjan et al.

(10) Patent No.: US 11,080,151 B2
(45) Date of Patent: Aug. 3, 2021

(54) RESTORATION OF CLOUD MANAGEMENT PLATFORM

(71) Applicant: Hewlett Packard Enterprise Development LP, Houston, TX (US)

(72) Inventors: Jyoti Ranjan, Bangalore Karnataka (IN); Unmesh Gurjar, Bangalore Karnataka (IN); Aiswarya Sundaran, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 160 days.

(21) Appl. No.: 16/143,612

(22) Filed: Sep. 27, 2018

(65) Prior Publication Data
US 2020/0104220 A1 Apr. 2, 2020

(51) Int. Cl.
| | | |
|---|---|---|
| G06F 11/00 | (2006.01) | |
| G06F 11/14 | (2006.01) | |
| H04L 29/14 | (2006.01) | |
| G06F 11/30 | (2006.01) | |
| G06F 16/23 | (2019.01) | |

(52) U.S. Cl.
CPC ...... *G06F 11/1471* (2013.01); *G06F 11/1451* (2013.01); *G06F 11/1464* (2013.01); *G06F 11/1469* (2013.01); *G06F 11/3006* (2013.01); *G06F 16/2365* (2019.01); *H04L 69/40* (2013.01); *G06F 2201/80* (2013.01)

(58) Field of Classification Search
CPC .................. G06F 11/1446; G05B 2219/34256
See application file for complete search history.

(56) References Cited

U.S. PATENT DOCUMENTS

| | | |
|---|---|---|
| 9,141,680 B2 | 9/2015 | Bengali et al. |
| 2005/0246311 A1 | 11/2005 | Whelan et al. |
| 2007/0260733 A1 | 11/2007 | Havemose et al. |
| 2013/0036212 A1 | 2/2013 | Jibbe et al. |
| 2015/0026349 A1 | 1/2015 | Iyoob |
| 2017/0201569 A1* | 7/2017 | Fu ........................ G06F 9/45558 |
| 2018/0041578 A1* | 2/2018 | Lee .......................... H04L 47/70 |
| 2018/0332064 A1* | 11/2018 | Harris ..................... H04L 43/08 |
| 2020/0007620 A1* | 1/2020 | Das ........................ H04L 43/045 |

OTHER PUBLICATIONS

Google Scholar/Patents—text refined (Year: 2021).*
NxtGen; "NxtGen Disaster Recovery as a Service"; printed on Jul. 24, 2018: https://nxtgen.com/pdf/NxtGen-DRaas-ProductNote.pdf; 5 pages.

* cited by examiner

*Primary Examiner* — Christopher S McCarthy
(74) *Attorney, Agent, or Firm* — Jaffery Watson Mendonsa & Hamilton

(57) ABSTRACT

In some examples, a method includes identifying, via the use of a Representational State Transfer (REST) Application Programming Interface (API) call, a modification of persistent data for a Cloud Management Platform (CMP); storing, in a persistent log for the CMP, information about the data modification, including an operation that modified the data, a component of the CMP that modified the data, and the time of modification; determining, as a result of a failure of the CMP, a restoration point for the CMP based on the persistent log; and restoring the CMP to the determined restoration point using an independent restoration system of the component that modified the data.

20 Claims, 9 Drawing Sheets

| Timestamp | CloudCruiser | Appliance manager | OpenStack API | InfluxDB |
|---|---|---|---|---|
| 2018-01-01 04:30:00 | ✓ | ✓ | ✗ | ✓ |
| 2018-02-10 09:30:00 | ✓ | ✓ | ✓ | ✗ |
| 2018-02-15 10:30:00 | ✓ | ✗ | ✓ | ✗ |
| 2018-03-09 15:30:00 | ✗ | ✗ | ✓ | ✗ |
| 2018-03-20 22:30:00 | ✗ | ✗ | ✓ | ✓ |
| 2018-04-02 20:30:00 | ✓ | ✓ | ✓ | ✓ |
| 2018-04-28 21:30:00 | ✓ | ✗ | ✗ | ✓ |
| 2018-05-25 10:30:00 | ✗ | ✗ | ✗ | ✓ |
| 2018-06-27 06:30:00 | ✓ | ✗ | ✗ | ✓ |
| 2018-06-28 10:30:00 | | | | ✓ |

*FIG. 3*

RESTORATION OF CLOUD MANAGEMENT PLATFORM

BACKGROUND

The term "cloud management" can, for example, refer to the management of public and private cloud computing products and services. The term "public cloud" can, for example, refer to a cloud managed by a service provider which can, for example, be accessed via the Internet. Public cloud providers often own and operate infrastructure at a data center to implement a public cloud. The term "private cloud" can, for example, refer to a cloud infrastructure operated for a single organization and may be hosted internally or externally. In "hybrid cloud" environments, cloud resources and data can be managed across multiple domains, which may include multiple public and private cloud domains. Cloud computing customers often rely on one or more third-party cloud management components to help manage their cloud services.

BRIEF DESCRIPTION OF DRAWINGS

FIG. 3 is a table showing a journal of restoration checkpoints, according to an example.

DETAILED DESCRIPTION

Figure 1:
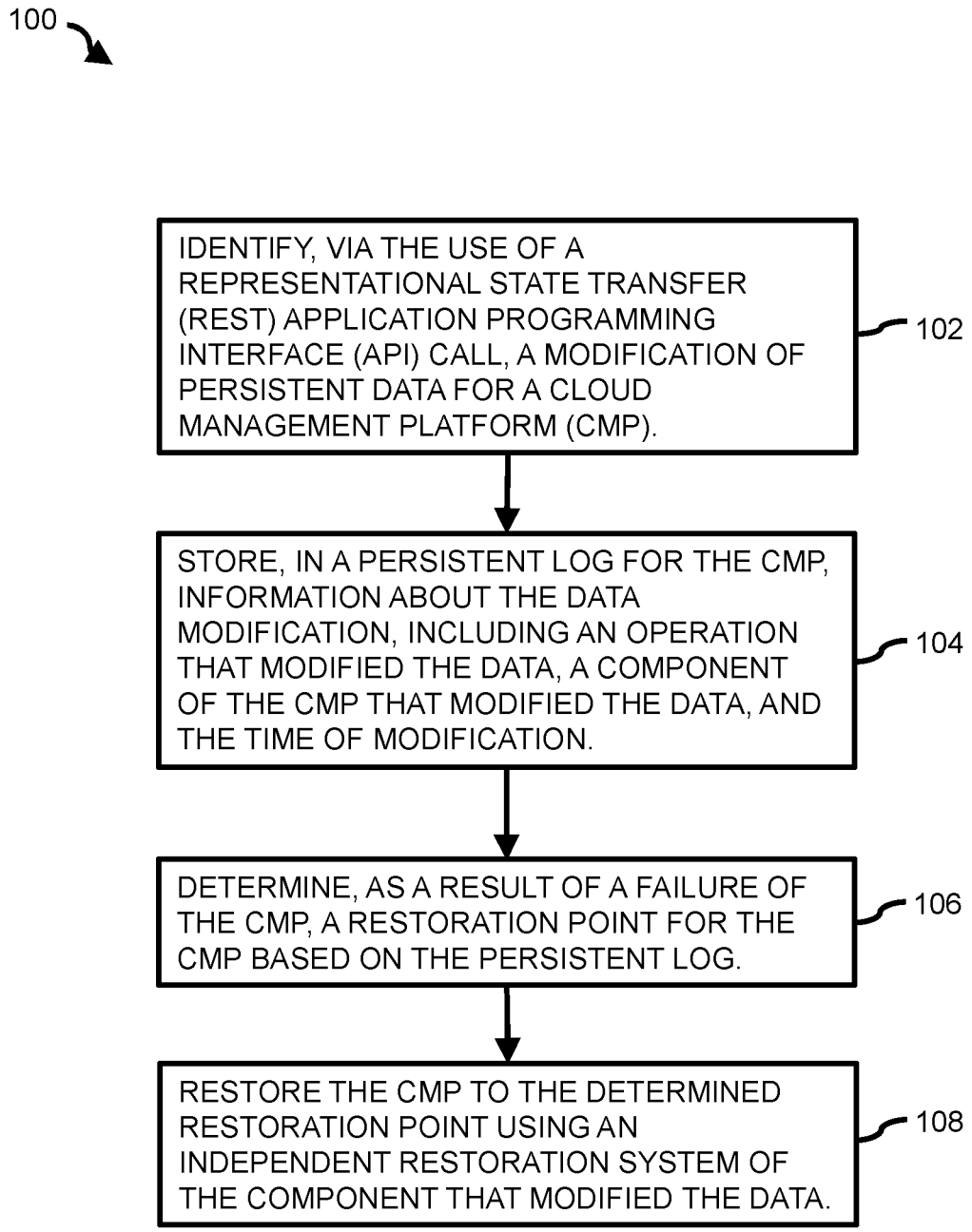
FIG. 1 is a flowchart for a method, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

In response to increasing complexity of public, private, and hybrid cloud environments, sophisticated cloud management platforms (CMPs) have emerged. CMPs can serve a variety of infrastructure, platform and software services in self-service and in a simplified manner for the consumer. CMPs can, for example, involve various aspects of Information Technology (IT) operations, including costing, billing, governance, infrastructure provisioning, etc.

CMP users often rely on a diverse set of specialized internal or third party components to perform specific functionality. For example, a CMP may rely on a first component (e.g., CloudCruiser) for cost and analytics, a second component (e.g., Amazon Web Service (AWS) Relational Database Service (RDS)) for database by application, a third component (e.g., AWS EBS volume) to store time series data, a fourth component (e.g., OpenStack) to provision compute infrastructure element, a fifth component (e.g., Prometheus) for monitoring and metering, as well as other components. It is appreciated that different components may use different mechanism to store persistent data. For example, some might use database, some might use file, some might use block volume. In other words, although certain CMPs appear as a single, simplified, and easy to use single point of contact for various cloud operations, such platforms often rely on the use of diverse and unrelated but integrated components to implement sophisticated platform behavior. The use of such tools often generate a variety of related data sets based on operations being performed by user.

Considering the widespread usage and reliance on cloud, customers often expect CMPs to be always available. If failure of one or more aspects of the CMP occurs, it may be critical to quickly restore the CMP while providing consistent behavior after restoration. Moreover, the occurrence of component failure is often inevitable and can occur at any point of time (e.g. after upgrade, due to partial site failure if solution is hosted in multiple places, etc.). Such failure can, for example, range from an individual service (or component) failure to complete management Software-as-a-Service (SaaS) portal failure (e.g., in case of disaster).

It is appreciated that there exist solutions that allow individual components to take data backup and restore it to its previous check-point. Because consumption of backed up data is meant for the specific component only, restoration to any point in time often does not cause inconsistency in behavior of that component if taken standalone except that there may be some data loss. The present disclosure is directed to a solution that provides more than such an individual components restoration mechanism. That is, although the components and tools of a CMP may have their own independent backup and disaster recovery solution, it may not be necessary or desirable to roll back all services to a point in time where everything is in the state of beginning state of deployment. Such a roll back can, in some situations, result in a significant loss of data or other undesirable outcomes. Certain implementations of the present disclosure seek to restore the CMP on failure to a point in time where systems are in consistent state as well as closest to last functioning point. As used herein, the term "consistent state" can, for example refer to the behavior of system as expected after restoration of data state as was before failure.

Certain implementations of the present disclosure are directed to a Consistent Restoration System (CRS) based on a journaling algorithm. The system can, for example, maintain an inventory of components and keep track of whose components persistent data changed and when. It can, in some implementations, keep track of the data modification pattern by storing it in journal (e.g., a persistent log). At the time of restoration, it can, in some implementations, scan and analyze the journal log to determine the best and optimal restoration point along with a list of components to be restored. Certain implementations of the present disclosure can provide a mechanism that allows the selection of different restore checkpoint with details of what the user will be able to restore. In some implementations, an administrator can select a specific restoration point for each component and can then initiate the restoration process. In some implementations, the selection and restoration process can be performed automatically or semi-automatically.

Certain implementations of the present disclosure are directed to restoration of CMPs. In some implementations, a method can include: (1) identifying, via the use of a Representational State Transfer (REST) Application Programming Interface (API) call, a modification of persistent data for a CMP; (2) storing, in a persistent log for the CMP, information about the data modification, including an operation that modified the data, a component of the CMP that modified the data, and the time of modification; (3) determining, as a result of a failure of the CMP, a restoration point for the CMP based on the persistent log; and (4) restoring the CMP to the determined restoration point using an independent restoration system of the component that modified the data.

Certain implementations of the present disclosure can provide a solution that is able to consistently restore CMPs comprised of heterogeneous systems with different backup solutions for one or more components. This can, in some implementations, allow a user to facilitate the extension of functionality of the CMP by integrating third party components. Certain implementations may provide insights on which component modified data, when the data was modified, and at what frequency by leveraging the information in a journal log. This may be used as part of recovery or as a side benefit of the solution. Certain implementations may provide the ability to restore only the components needed to bring the CMP into a consistent state. Other advantages of implementations presented herein will be apparent upon review of the description and figures.

FIG. 1 depicts a flowchart for an example method 100 related to restoration of a CMP. In some implementations, method 100 can be implemented or otherwise executed through the use of executable instructions stored on a memory resource (e.g., the memory resource of the computing device of FIG. 8), executable machine readable instructions stored on a storage medium (e.g., the medium of FIG. 9), in the form of electronic circuitry (e.g., on an Application-Specific Integrated Circuit (ASIC)), and/or another suitable form. Although the description of method 100 herein primarily refers to steps performed on a server for purposes of illustration, it is appreciated that in some implementations, method 100 can be executed on another suitable computing device. In some implementations, method 100 can be executed on multiple computing devices in parallel (e.g., in a distributed computing fashion).

Method 100 includes identifying (at block 102), via the use of a Representational State Transfer (REST) Application Programming Interface (API) call, a modification of persistent data for a CMP. Such data can, for example, be in the form of data generated by an individual component of the CMP (e.g., cost and analytic data by a first component, management application data stored in a relational database service, etc.). In some implementations, identifying a system component that modifies data includes tracking certain API calls that are pre-determined to result in change of data. Such API calls can, for example, include POST, PUT, PATCH, and DELETE calls.

Method 100 includes storing (at block 104), in a persistent log for the CMP, information about the data modification, including an operation that modified the data, a component of the CMP that modified the data, and the time of modification. In some implementations, block 104 can include maintaining a track of which operation resulted in change of data of which component and when. Block 104 can, in some implementations be initiated by a system and/or a user.

It is appreciated the storing of block 104 can include the process of maintaining a journal of data check-point for an array of CMP components. Such a journal is different from the individual component's journal which is dedicated for system but not for a platform as whole. In some implementations, the log can include information about multiple acts of data modification, including each operation that modified data, each component of the CMP that modified data, and the time of each modification.

Method 100 includes determining (at block 106), as a result of a failure of the CMP, a restoration point for the CMP based on the persistent log. In some implementations, block 106 can include analytically determining which components need to be restored for a given restoration checkpoint so that there is no conflict in consistency of system. E.g., a cloud and analytics generating component may be associated with another application that consumes cost and analytic data such that they are both rolled back or restored to a previous point in time. In some implementations, block 106 includes applying analytics to determine a check-point that can be applied such that diverse system components are consistent in generating cross dependent data. In some implementations, determining a restoration point for the CMP based on the persistent log includes determining a last functioning point of the CMP. In some implementations, the failure of the CMP triggers a disaster recovery operation by the system.

Method 100 includes restoring (at block 108) the CMP to the determined restoration point using an independent restoration system of the component that modified the data. In some implementations, restoring the CMP to the determined restoration point includes leveraging an independent backup system of the component that modified the data. In some implementations, restoring the CMP to the determined restoration point includes restoring only a subset of components of the CMP.

It is appreciated that one or more operations of method 100 can be performed periodically. For example, in some implementations, one or more of blocks 102, 104, 106, and 108 (or other operations described herein) may be performed periodically. The various period times for blocks 102, 104, 106, and 108 (or other operations described herein) may be the same or different times. For example, in some implementations, the period of block 102 is every 1 minute and the period of block 104 is every 5 minutes. It is further appreciated, that the period for a given block may be regular (e.g., every 1 minute) or may be irregular (e.g., every 1 minute during a first condition, and every 5 minutes during a second condition). In some implementations, one or more of block 102, 104, 106, and 108 (or other operations described herein) may be non-periodic and may be triggered by some network or other event.

Although the flowchart of FIG. 1 shows a specific order of performance, it is appreciated that this order may be rearranged into another suitable order, may be executed concurrently or with partial concurrence, or a combination thereof. Likewise, suitable additional and/or comparable steps may be added to method 100 or other methods described herein in order to achieve the same or comparable functionality. In some implementations, one or more steps are omitted. For example, in some implementations, block 102 of identifying a data modification can be omitted from method 100 or performed by a different device. It is appreciated that blocks corresponding to additional or alternative functionality of other implementations described herein can be incorporated in method 100. For example, blocks corresponding to the functionality of various aspects of implementations otherwise described herein can be incorporated in method 100 even if such functionality is not explicitly characterized herein as a block in method 100.

Various example implementations for the present disclosure will now be described. It is appreciated that these examples may include or refer to certain aspects of other implementations described herein (and vice-versa), but are not intended to be limiting towards other implementations described herein. Moreover, it is appreciated that certain aspects of these implementations may be applied to other implementations described herein.

In this specific example of the present disclosure, a CMP in the form of a SaaS portal relies on centralized and unified REST endpoints to perform various administrative and management operations. The portal relies on independent and specialized system components for functionality. Operations exercised using an API results in invocation of REST API call (e.g., GET, PUT, POST, PATCH, DELETE, etc.) of a sub-system component which may result in change in persistent data.

Figure 2:
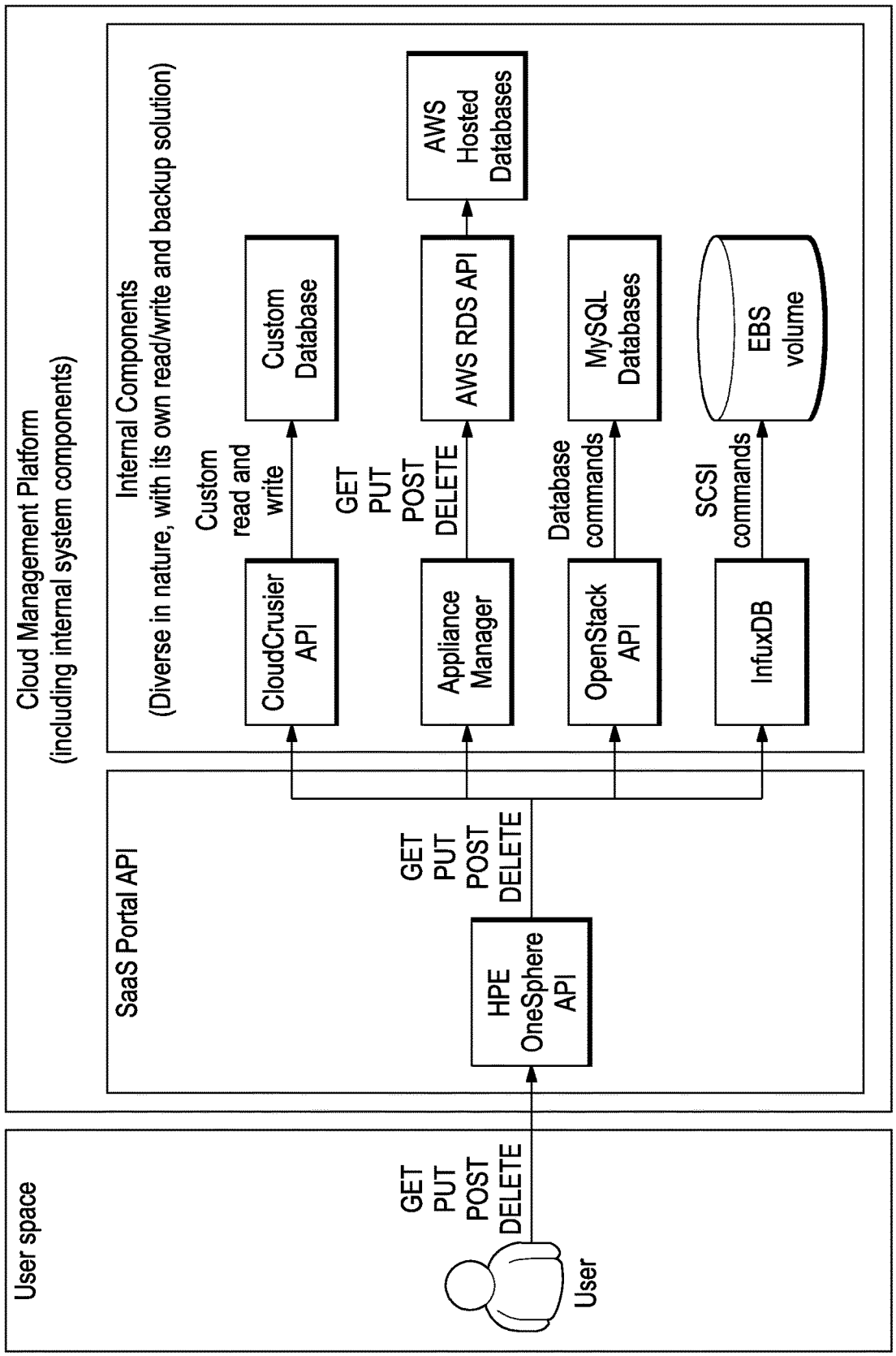
FIG. 2 is a diagram showing, inter alia, components of a cloud management platform, according to an example.
Figure 4:
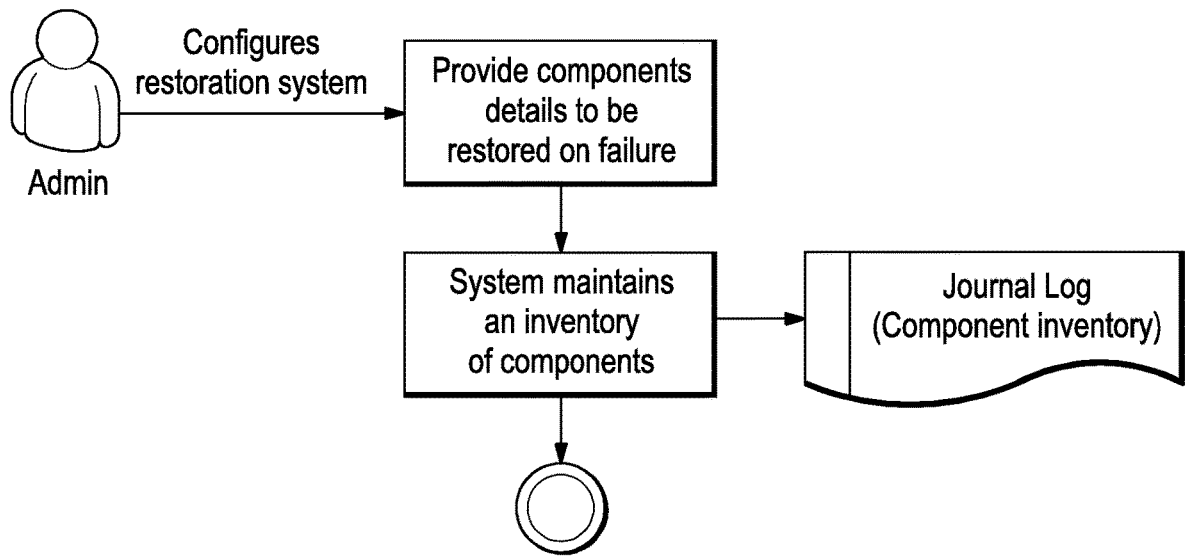
FIG. 4 is a diagram relating to configuring a consistent restoration service, according to an example.
Figure 5:
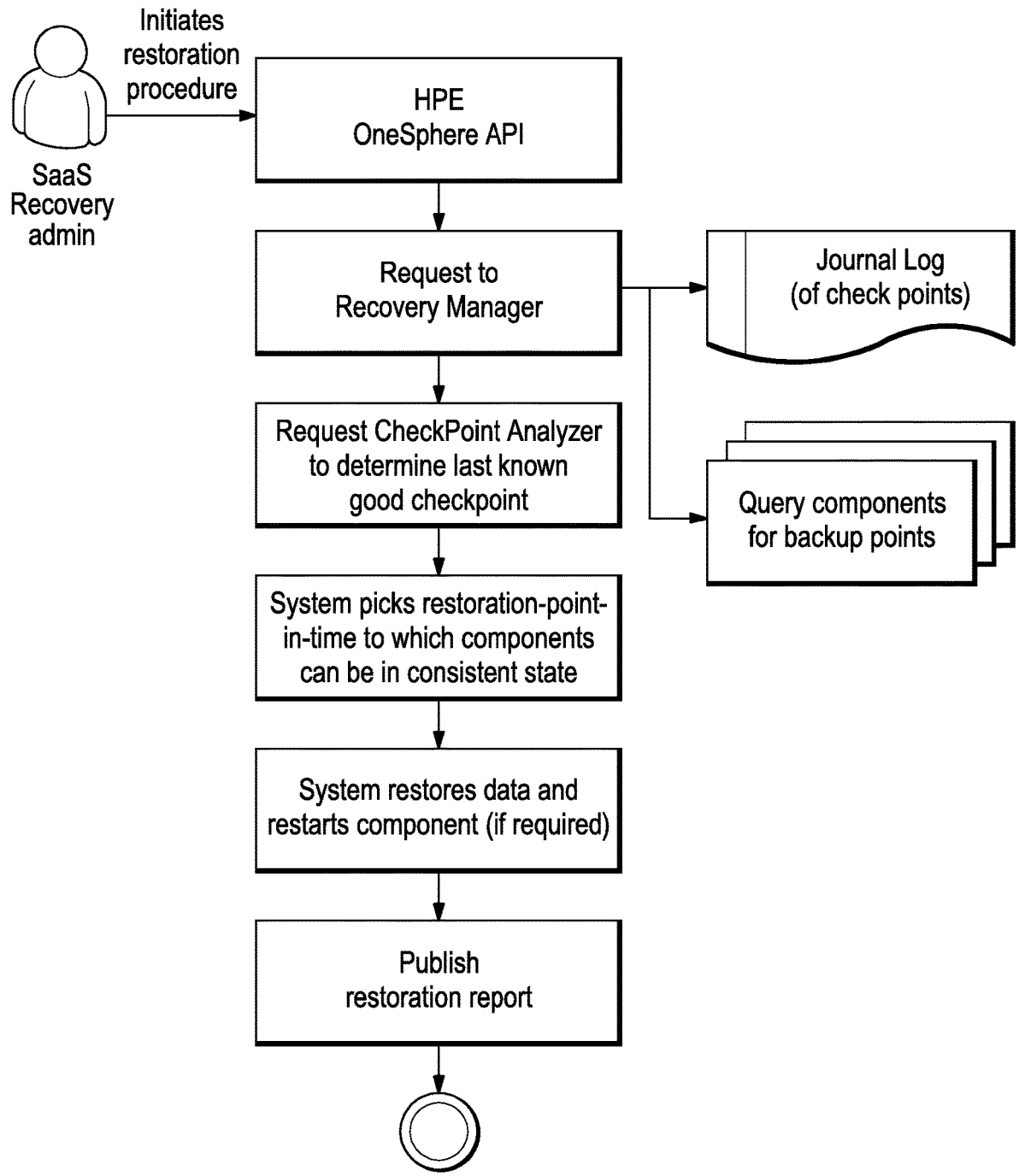
FIG. 5 is a diagram relating to consistently restoring a cloud management platform, according to an example.
Figure 6:
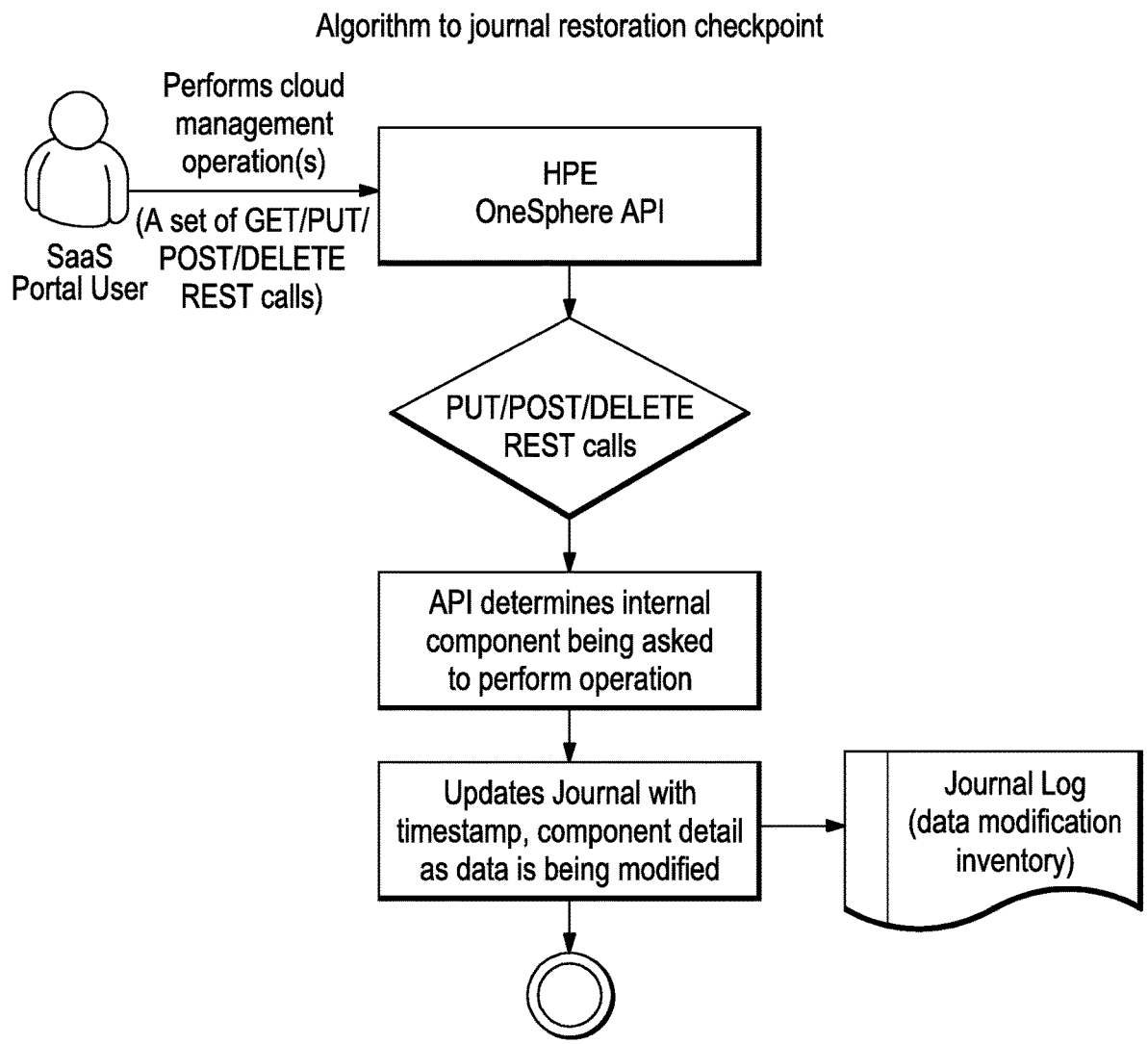
FIG. 6 is a diagram relating to journaling a restoration checkpoint, according to an example.
Figure 7:
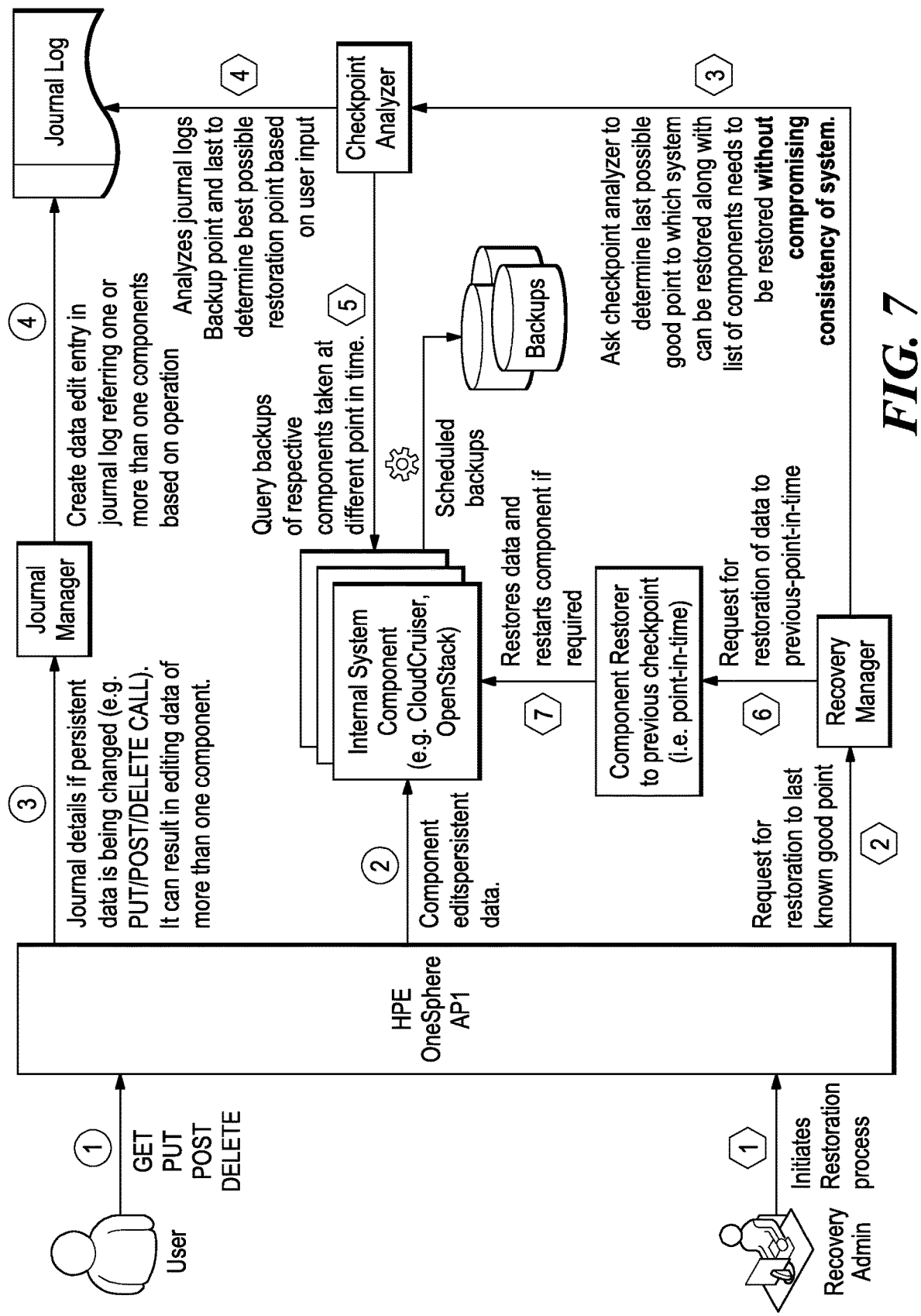
FIG. 7 is a diagram relating to a solution architecture for a consistent restoration service, according to an example.

The above example REST API calls can cause a change in persistent state of REST resources and hence change in underneath persistent data. So, it is easy to determine which component is going to modify data which might restoration later. To illustrate this, the following description will refer to an example CMP that uses the following components and is represented diagrammatically in FIG. 2:

NCS API as entry point for admin and management operation.
CloudCruiser API to maintain cost and analytic data
Different microservice API to perform specific functionality and they persist their data in AWS RDS databases.

This example of the present disclosure describes a Consistent Restoration System (CRS) that has a configuration system that primarily provides a native and simple interface to inform the CRS what components are to be considered for data tracking and restored if required on failure. The CRS further includes a journaling system to maintain a set of check points so that it can be utilized appropriately at the time of restoring components. The journaling system maintains an inventory of component having persistent data and creates a journal (illustrated diagrammatically in FIG. 3) to track which component modifies persistent data and when the data is modified. It does so primarily by looking at the type of REST call. So if any operation results into PUT, POST or DELETE call, it assumes that component is going to modify persistent data and hence needs to be journaled.

The CRS further includes a disaster recovery system that kicks in at the time of restoring system if there is a failure and admin initiates recovery. The disaster recovery system further scans the journal to determine last known good point in time to which system can be restored without bringing any inconsistency in overall behavior of the CMP with a known aspect of what will be lost if a given restoration point is selected. The disaster recovery system further restores data of specific component to previous point in time and restarts services or components if necessary.

With reference to FIGS. 4-7, three algorithms can be leveraged to implement the solution. A first algorithm can be provided to configure the "Consistent Restoration" service. An administrator can provide components details participating in recovery process and the recovery system can create a journal log and maintains an inventory of components. A second algorithm can be provided for the journal restoration checkpoint. In this algorithm, a SaaS Portal user can performs cloud management operation(s). The CMP API can determine whether operation will result to change in persistent data modification. Accordingly, it updates journal with details like timestamp, component name, etc.

A third algorithm can be provided to consistently restore a CMP comprised of heterogeneous components. An administrator can initiate a recovery procedure using a CMP API which in turn routes the request to a recovery manager. The recovery manager can request a 'checkpoint analyzer' to determine last known good checkpoint. The 'check-point analyzer' can pick a recovery-point-in-time to which components can be in consistent state as per their write stamp logged in journal. The 'recovery manager' can ask a 'restoration manager' to restore data and restarts component (if required). The recovery manager can also publish a recovery report.

Figure 8:
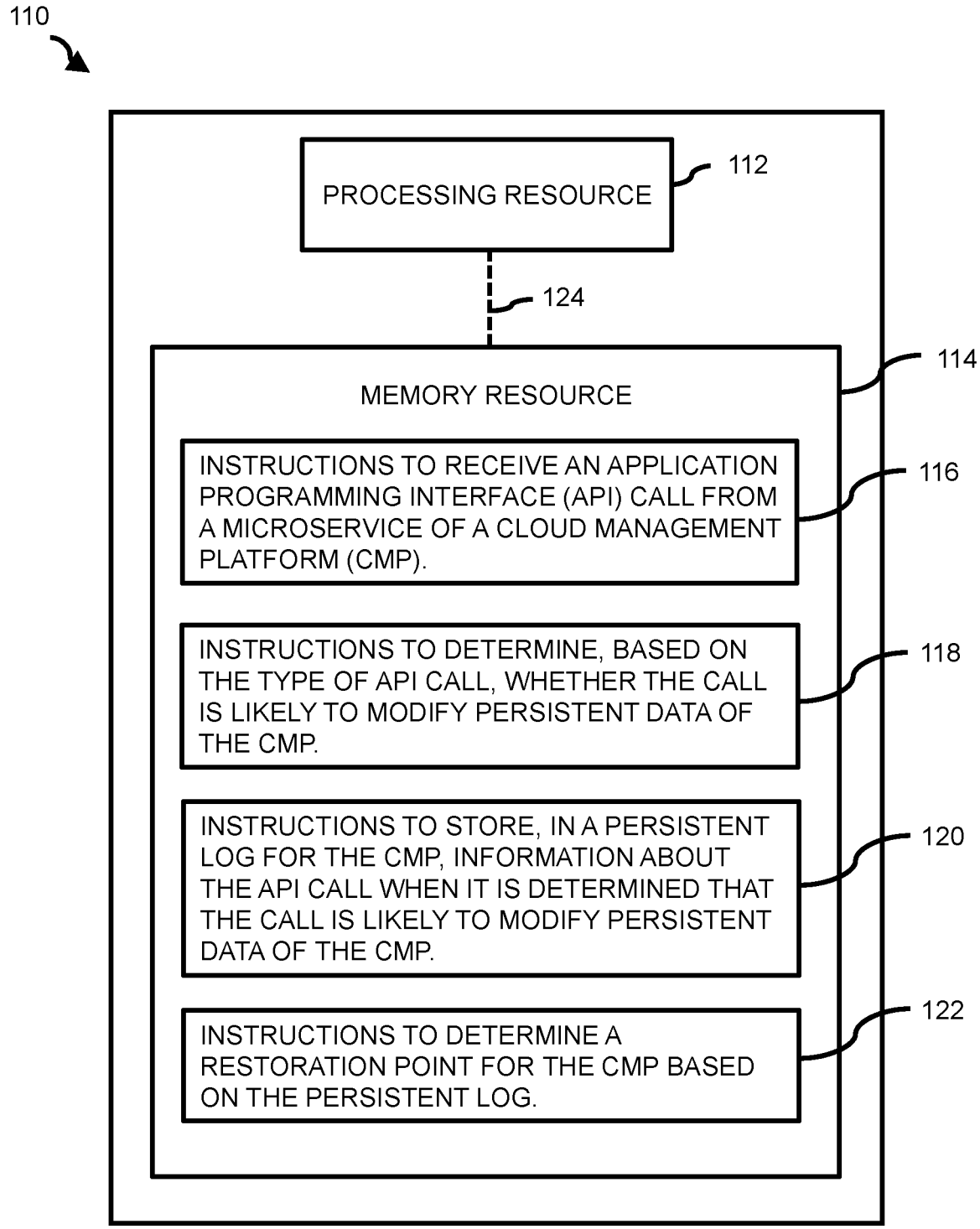
FIG. 8 is a diagram of a computing device, according to an example.

FIG. 8 is a diagram of a computing device 110 in accordance with the present disclosure. Computing device 110 can, for example, be in the form of a server or another suitable computing device. As described in further detail below, computing device 110 includes a processing resource 112 and a memory resource 114 that stores machine-readable instructions 116, 118, 120, and 122. For illustration, the description of computing device 110 makes reference to various aspects of method 100 and the other implementations described herein. However it is appreciated that computing device 110 can include additional, alternative, or fewer aspects, functionality, etc., than the implementations described elsewhere herein and is not intended to be limited by the related disclosure thereof.

Instructions 116 stored on memory resource 114 are, when executed by processing resource 114, to cause processing resource 114 to receive an API call from a microservice of a CMP. Instructions 116 can incorporate one or more aspects of blocks of method 100 or another suitable aspect of other implementations described herein (and vice versa). Instructions 118 stored on memory resource 114 are, when executed by processing resource 114, to cause processing resource 114 to determine, based on the type of API call, whether the call is likely to modify persistent data of the CMP. Instructions 118 can incorporate one or more aspects of blocks of method 100 or another suitable aspect of other implementations described herein (and vice versa).

Instructions 120 stored on memory resource 114 are, when executed by processing resource 114, to cause processing resource 114 to store, in a persistent log for the CMP, information about the API call when it is determined that the call is likely to modify persistent data of the CMP. Instructions 120 can incorporate one or more aspects of blocks of method 100 or another suitable aspect of other implementations described herein (and vice versa). Instructions 122 stored on memory resource 114 are, when executed by processing resource 114, to cause processing resource 114 to determine a restoration point for the CMP based on the persistent log. Instructions 122 can incorporate one or more aspects of blocks of method 100 or another suitable aspect of other implementations described herein (and vice versa). For example, in some implementations, instructions 122 are to cause the processing resource is to determine a restoration point that restores functionality to the CMP from before a component failure.

Processing resource 114 of computing device 110 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 114, or suitable combinations thereof. Processing resource 114 can, for example, include single or multiple cores on a chip, multiple cores across multiple chips, multiple cores across multiple devices, or suitable combinations thereof. Processing resource 114 can be functional to fetch, decode, and execute instructions as described herein. As an alternative or in addition to retrieving and executing instructions, processing resource 114 can, for example, include at least one integrated circuit (IC), other control logic, other electronic circuits, or suitable combination thereof that include a number of electronic components for performing the functionality of instructions stored on memory resource 114. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 114 can, for example, be implemented across multiple processing units and instructions may be implemented by different processing units in different areas of computing device 110.

Memory resource 114 of computing device 110 can, for example, be in the form of a non-transitory machine-readable storage medium, such as a suitable electronic, magnetic, optical, or other physical storage apparatus to contain or store information such as machine-readable instructions 116, 118, 120, and 122. Such instructions can be operative to perform one or more functions described herein, such as those described herein with respect to method 100 or other methods described herein. Memory resource 114 can, for example, be housed within the same housing as processing resource 114 for computing device 110, such as within a computing tower case for computing device 110 (in implementations where computing device 110 is housed within a computing tower case). In some implementations, memory resource 114 and processing resource 114 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 114 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 114 can be in communication with processing resource 114 via a communication link 124. Each communication link 124 can be local or remote to a machine (e.g., a computing device) associated with processing resource 114. Examples of a local communication link 124 can include an electronic bus internal to a machine (e.g., a computing device) where memory resource 114 is one of volatile, non-volatile, fixed, and/or removable storage medium in communication with processing resource 114 via the electronic bus.

In some implementations, one or more aspects of computing device 110 can be in the form of functional modules that can, for example, be operative to execute one or more processes of instructions 116, 118, 120, or 122 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 110 can, for example, include one or more machine-readable storage mediums and one or more computer processors.

In view of the above, it is appreciated that the various instructions of computing device 110 described above can correspond to separate and/or combined functional modules. For example, instructions 116 can correspond to an "API call receiving module" to receive an API call from a microservice of a CMP. Likewise, instructions 122 can correspond to a "restoration point determination module" to determine a restoration point for the CMP based on the persistent log. As but one example, in some implementations, a single module can be used to both receive an API call (e.g., corresponding to the functionality of instructions 116) and to determine a restoration point as well as to transmit a transmit stream (e.g., corresponding to the functionality of instructions 122).

Figure 9:
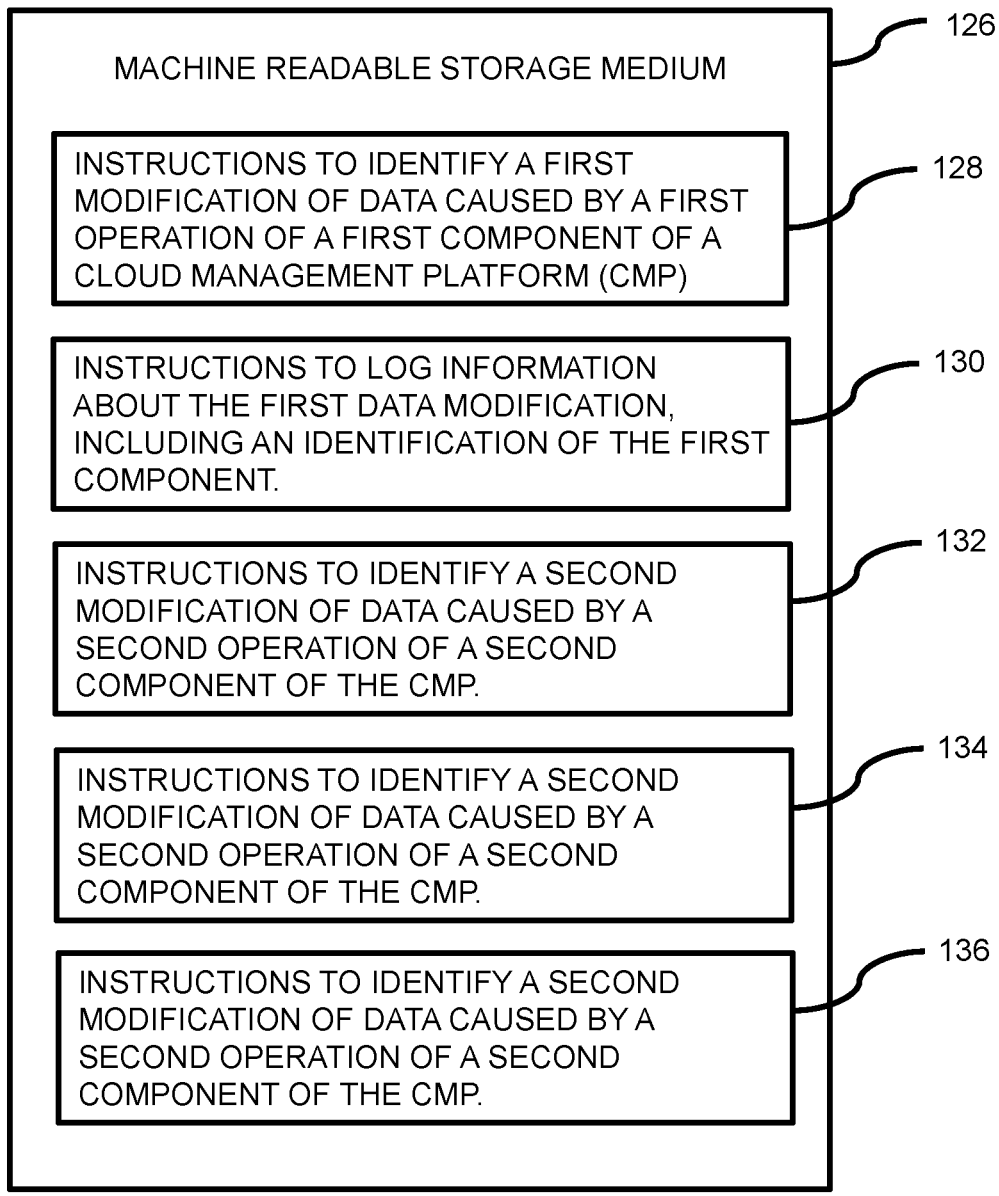
FIG. 9 is a diagram of machine-readable storage medium, according to an example.

FIG. 9 illustrates a machine-readable storage medium 126 including various instructions that can be executed by a computer processor or other processing resource. In some implementations, medium 126 can be housed within a server or on another computing device. For illustration, the description of machine-readable storage medium 126 provided herein makes reference to various aspects of computing device 110 (e.g., processing resource 114) and other implementations of the disclosure (e.g., method 100). Although one or more aspects of computing device 110 (as well as instructions such as instructions 128, 130, 132, and 134) can be applied to or otherwise incorporated with medium 126, it is appreciated that in some implementations, medium 126 may be stored or housed separately from such a system. For example, in some implementations, medium 126 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 126 includes machine-readable instructions 128 stored thereon to cause processing resource 114 to identify a first modification of data caused by a first operation of a first component of a CMP. Instructions 129 can, for example, incorporate one or more aspects of block 102 of method 100 or another suitable aspect of other implementations described herein (and vice versa). Medium 126 includes machine-readable instructions 130 stored thereon to cause processing resource 114 to log information about the first data modification, including an identification of the first component. Instructions 130 can, for example, incorporate one or more aspects of block 104 of method 100 or another suitable aspect of other implementations described herein (and vice versa).

Medium 126 includes machine-readable instructions 132 stored thereon to cause processing resource 114 to identify a second modification of data caused by a second operation of a second component of the CMP. Instructions 132 can, for example, incorporate one or more aspects of block 102 of method 100 or another suitable aspect of other implementations described herein (and vice versa). Medium 126 includes machine-readable instructions 134 stored thereon to cause processing resource 114 to log information about the second data modification, including an identification of the second component. Instructions 134 can, for example, incorporate one or more aspects of block 104 of method 100 or another suitable aspect of other implementations described herein (and vice versa).

Medium 126 includes machine-readable instructions 136 stored thereon to cause processing resource 114 to determine a restoration point for the CMP based on the logged information. Instructions 136 can, for example, incorporate one or more aspects of block 106 of method 100 or another suitable aspect of other implementations described herein (and vice versa). For example, in some implementations, instructions 136 include automatically restoring the CMP based on the determined restoration point.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
    identifying, via the use of a Representational State Transfer (REST) Application Programming Interface (API) call, a modification of persistent data for a Cloud Management Platform (CMP);
    storing, in a journal log for the CMP, information about the data modification, including a cloud management operation that modified the data, a component of a plurality of cloud management components of the CMP that modified the data, and the time of modification;
    programmatically determining, as a result of a failure of the CMP, a restoration point for the CMP in which the plurality of components are in a consistent state based on the journal log; and
    restoring the CMP to the determined restoration point using an independent restoration system of the component that modified the data.

2. The method of claim 1, wherein the journal log includes information about multiple acts of data modification, including each cloud management operation that modified data, each component of the plurality of cloud management components of the CMP that modified data, and the time of each modification.

3. The method of claim 1, wherein restoring the CMP to the determined restoration point includes leveraging an independent backup system of the component that modified the data.

4. The method of claim 1, wherein one component of plurality of components of the CMP is a public cloud Relational Database Service (RDS).

5. The method of claim 1, wherein one component of plurality of components of the CMP is OpenStack.

6. The method of claim 1, wherein one component of plurality of components of the CMP is a third-party component that interfaces with the CMP via an API.

7. The method of claim 1, wherein said programmatically determining a restoration point for the CMP based on the journal log includes determining a last functioning point of the CMP.

8. The method of claim 1, wherein said identifying includes tracking certain API calls that are pre-determined to result in change of data.

9. The method of claim 8, wherein the API calls that are pre-determined to result in change of data include POST, PUT, PATCH, and DELETE calls.

10. The method of claim 1, wherein the failure of the CMP triggers a disaster recovery operation by the CMP.

11. The method of claim 1, wherein restoring the CMP to the determined restoration point includes restoring only a subset of the plurality of components of the CMP.

12. A non-transitory machine readable storage medium having stored thereon machine readable instructions to cause a computer processor to:
    identify a first modification of data caused by a first cloud management operation of a first component of a plurality of cloud management components of a Cloud Management Platform (CMP);
    log information about the first data modification, including an identification of the first component in a journal log for the CMP;
    identify a second modification of data caused by a second cloud management operation of a second component of the plurality of cloud management components;
    log information about the second data modification in the journal log, including an identification of the second component; and
    programmatically determine a restoration point for the CMP in which the first component and the second component are in a consistent state based on the journal log.

13. The medium of claim 12, further comprising:
    automatically restoring the CMP based on the determined restoration point.

14. The medium of claim 13, wherein said automatically restoring the CMP includes leveraging an independent backup system of the first component or the second component.

15. The medium of claim 12, wherein the restoration point is programmatically determined by determining a last functioning point of the CMP.

16. A system comprising:
    a processing resource; and
    a memory resource storing machine readable instructions to cause the processing resource to:
        receive an Application Programming Interface (API) call from a microservice of a Cloud Management Platform (CMP);

determine, based on a type of the API call, whether the API call is likely to modify persistent data of the CMP;

store, in a journal log for the CMP, information about the API call when it is determined that the API call is likely to modify persistent data of the CMP, wherein the information includes a cloud management operation associated with the API call, a name of a component of a plurality of cloud management components of the CMP with which the API call is associated, and a timestamp; and programmatically determine a restoration point for the CMP based on the persistent log.

17. The system of claim 16, wherein the restoration point restores functionality to the CMP from before a component failure.

18. The system of claim 16, wherein the type of the API call likely to modify persistent data includes a set of predetermined API calls.

19. The system of claim 16, wherein the instructions further cause the processing resource to automatically restore the CMP based on the determined restoration point.

20. The system of claim 19, wherein automatically restoring the CMP includes leveraging an independent backup system of one component of the plurality of cloud management components.

* * * * *